No. 880,561. PATENTED MAR. 3, 1908.
W. A. MITCHELL.
FERTILIZER DISTRIBUTER.
APPLICATION FILED SEPT. 13, 1907.

Witnesses
Inventor
William A. Mitchell
By
Attorneys

UNITED STATES PATENT OFFICE.

WILLIAM ALISON MITCHELL, OF FITZGERALD, GEORGIA.

FERTILIZER-DISTRIBUTER.

No. 880,561.　　　Specification of Letters Patent.　　　Patented March 3, 1908.

Application filed September 13, 1907. Serial No. 392,701.

*To all whom it may concern:*

Be it known that I, WILLIAM ALISON MITCHELL, a citizen of the United States, residing at Fitzgerald, in the county of Irwin and State of Georgia, have invented a new and useful Fertilizer-Distributer, of which the following is a specification.

This invention relates to fertilizer distributers.

The object of the invention is to provide an apparatus of this character which shall be exceedingly simple of construction, durable in use, and which may be adjusted to supply fertilizer to two rows at one time or to a single row. Furthermore, to construct the discharging chutes in such manner as that they may readily be adjusted to accommodate themselves to different widths of rows.

With the above and other objects in view, as will appear as the nature of the invention is better understood, the same consists in the novel construction and combination of parts of a fertilizer distributer as will be hereinafter fully described and claimed.

Figure 1:
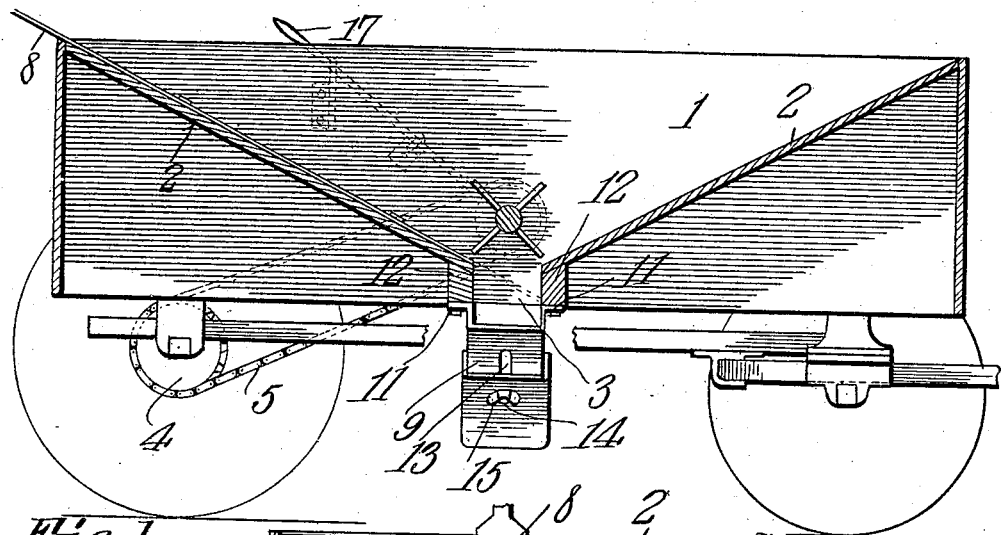
Figure 2:
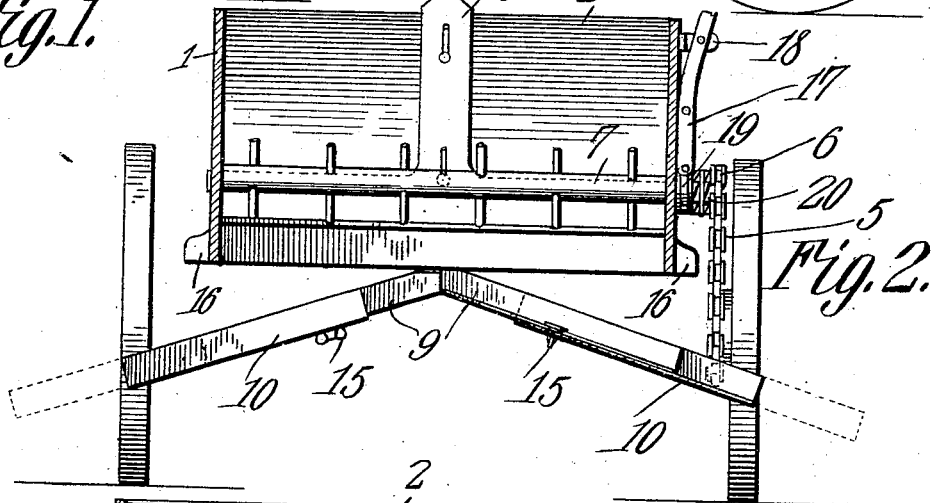
Figure 3:
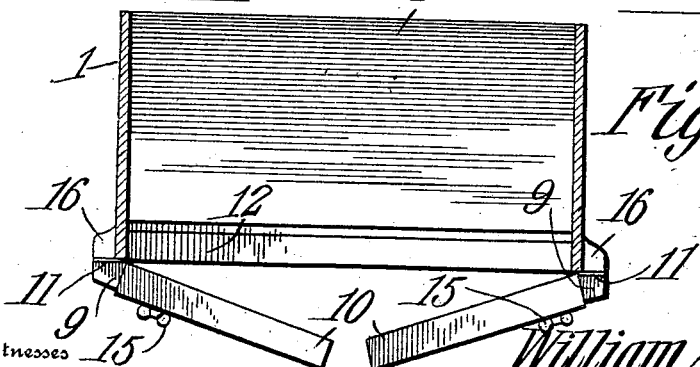

In the accompanying drawings forming a part of this specification and in which like characters of reference indicate corresponding parts, Figure 1 is a view in vertical longitudinal section through a fertilizer distributer embodying the improvements of the present invention. Fig. 2 is a vertical transverse sectional view. Fig. 3 is a view similar to Fig. 2, displaying the adjustment of the chutes for supplying the fertilizer to a single row.

Referring to the drawings, 1 designates the body of the distributer, which may be of the usual or any preferred construction and is provided with inclined bottoms 2 that form a hopper and that terminate over an opening 3 in the bottom of the body. The body, as usual, is supported upon suitable wheels and on the hub of one of these wheels is arranged a sprocket-wheel 4, around which passes a sprocket-chain 5 to a sprocket-wheel 6 carried by the agitator shaft 7, which latter is provided with the usual agitating arms for preventing the fertilizer from collecting in the bottom of the body.

Disposed upon one of the bottoms 2 is a cut-off 8 which operates in the usual manner to prevent undesired escape of fertilizer from the distributer, as when the latter is being drawn from the barn to the field.

The novelty of the present invention resides in the distributing chutes by which fertilizer is conveyed from the body to the rows. Of these chutes there are two, each a counterpart of the other, and each consists of two trough-like sections 9 and 10, the former of which are provided with out-turned flanges 11 that are bolted or otherwise secured to beams 12 that extend transversely of the body of the distributer. Each of the sections 9 is provided with a longitudinal slot 13 through which extends a bolt 14 that passes through the bottom of the section 10 and carries a winged nut 15 by which the bolt may be tightened thus to hold the two sections properly adjusted. By the provision of the slots, bolts and nuts, the chutes may be adjusted to any width of row, and as they are oppositely-inclined and project from opposite sides of the body, the fertilizer may be supplied to two rows at one time, as shown in Fig. 2.

When it is desired to supply fertilizer to but a single row the chutes are detached from the beams 12 and the flanges 11 of the sections 9 are bolted to blocks 16 secured to the outer sides of the body. When the chutes are thus disposed the cut-off 8 may be adjusted in the manner above set forth so as to discharge as small or large a quantity of fertilizer as may be preferred.

In order to check the rotation of the agitator when the machine is not depositing fertilizer, there is a lever 17 provided which is fulcrumed on a bracket 18 secured to one side of the body and engages at its lower end with a clutch member 19. The sprocket wheel 6 is provided with a clutch member 20 that is engaged by the clutch member 19 when the agitator shaft is being driven, but when it is desired to stop the same the lever is shifted to disengage the clutch members, whereupon the rotation of the shaft 7 will cease. When the machine is not in operation the cut-off 8 will be actuated to close the escape passage 3 in the bottom of the body.

It will be seen from the foregoing description that although the improvements herein defined are simple in character they will be thoroughly efficient for the purposes designed and will result in imparting added utility to the ordinary fertilizer distributer.

What is claimed is:—

In a fertilizer distributer, the combination with a body, of oppositely inclined bottoms secured thereto and having their lower ends spaced apart to provide an escape opening, beams secured to the body and extending along the edges of the opening, blocks secured to the outer sides of the body, and discharge chutes having flanges adapted for connection with either the beams or the blocks whereby to adapt the machine to supply fertilizer to one or to two rows.

In testimony that I claim the foregoing as my own, I have hereto affixed my signature in the presence of two witnesses.

WILLIAM ALISON MITCHELL.

Witnesses:
NANNIE CURETON,
J. B. D. PAULL.